Oct. 9, 1923.
H. F. TAYLOR, JR
1,470,127
VEHICLE SIGNAL
Filed Jan. 2, 1920    2 Sheets-Sheet 1
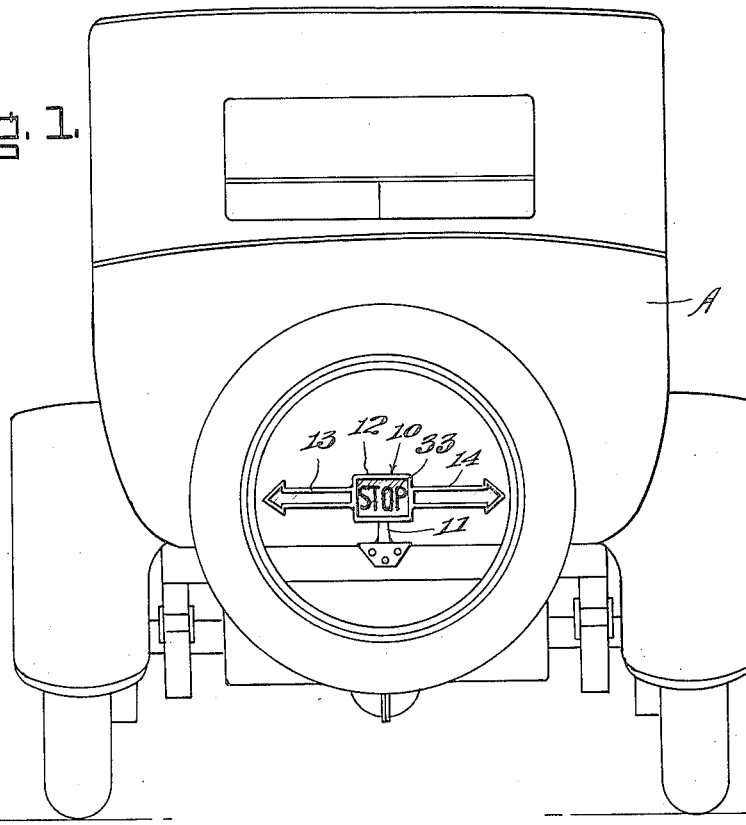
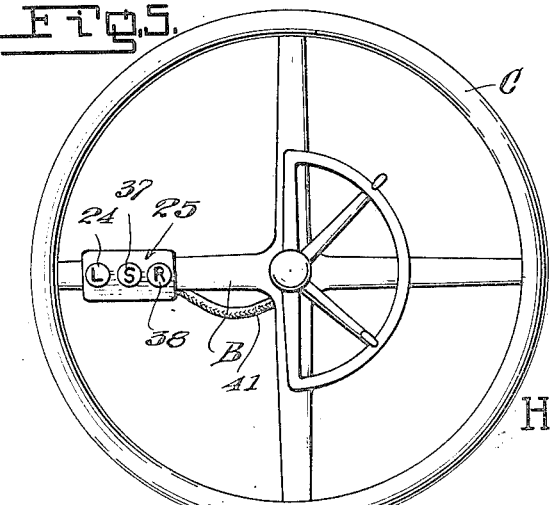
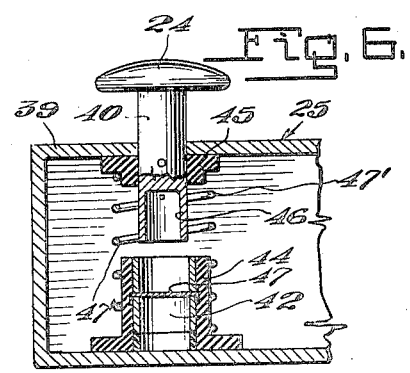
Horace F. Taylor Jr. Inventor

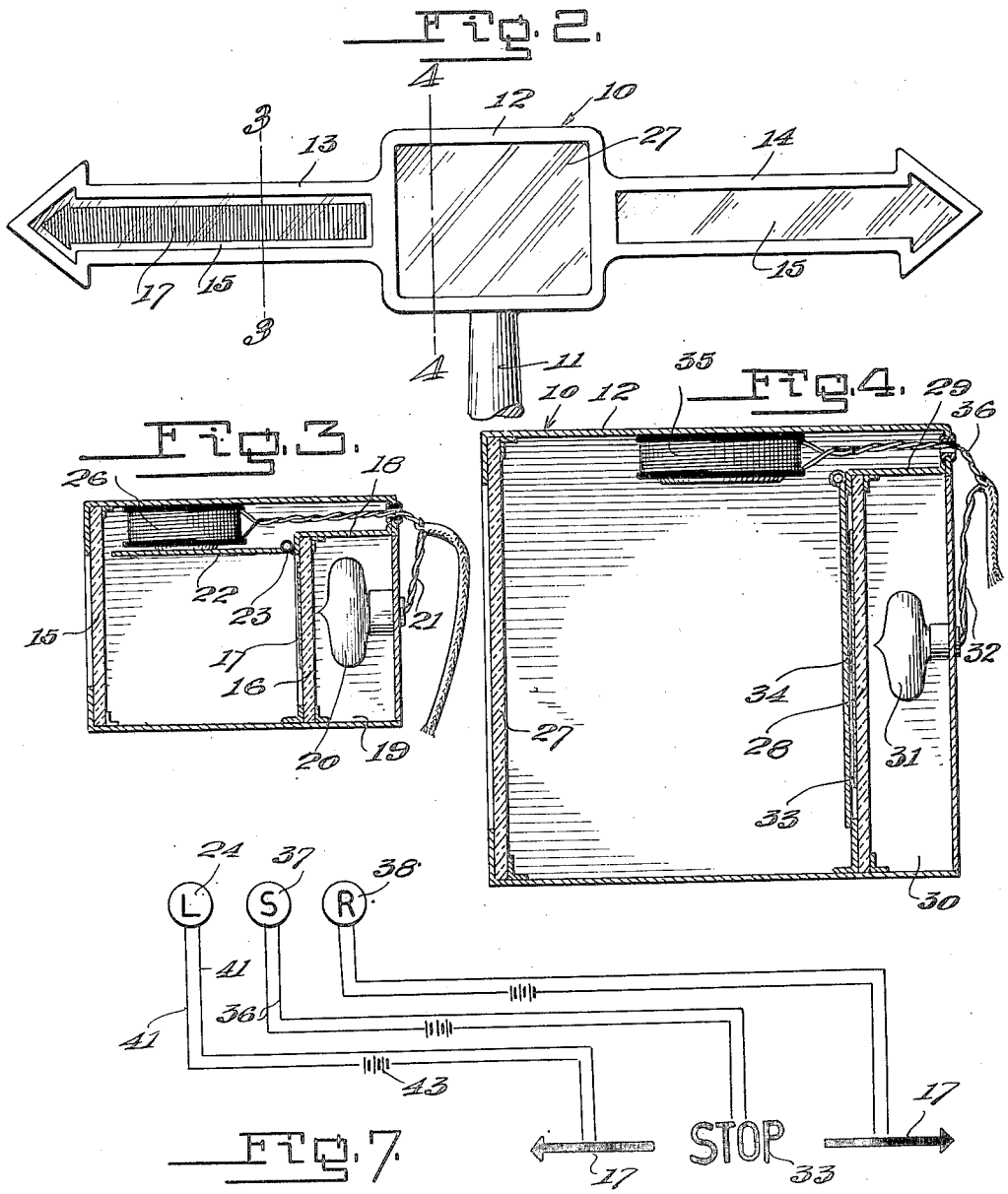

Patented Oct. 9, 1923.

1,470,127

UNITED STATES PATENT OFFICE.

HORACE F. TAYLOR, JR., OF BUFFALO, NEW YORK.

VEHICLE SIGNAL.

Application filed January 2, 1920. Serial No. 348,740.

*To all whom it may concern:*

Be it known that I, HORACE F. TAYLOR, Jr., a citizen of the United States, residing at Buffalo, in the county of Erie and State of New York, have invented certain new and useful Improvements in Vehicle Signals, of which the following is a specification.

This invention relates to vehicle signals, designed principally for use upon motor vehicles, and an object of the invention is to provide a signal mechanism by means of which the driver of a motor vehicle may acquaint any one following him of his intention to deviate from the straight away continuous course, which he is following, which signal mechanism is simple in construction, artistically designed so as to add to the appearance of the car, rather than detract therefrom, one which may be operated from the driver's seat, control therefor being carried by the steering wheel.

A further object of this invention is to provide a vehicle signal as specified which includes a box or casing structure adapted to be mounted at any convenient location upon the rear end of the motor vehicle and comprising a single substantially rectangular portion and laterally extending L-shaped portion in each of which portions is mounted a transparent partition behind which an ordinary electric lamp bulb is mounted, and which transparent partition preferably carried suitable indicia which may be visible either in the daytime or at night by the igniting of the electric lamp bulb therebehind for acquainting the driver of the following vehicle of the direction about to be taken by the driver of the vehicle upon which the improved signal mechanism is designed, these indicia normally being in non-exhibited position, being hidden from view by hinged curtains of suitable metal which are adapted to be attracted by electric magnets, for moving the curtains from in front of the transparent partition carried indicia to permit the said indicia to be exhibited, the energizing of the electromagnet being controlled from the steering wheel of the vehicle or any other position convenient to the driver's seat.

A further object of this invention is to provide a novel form of switch mechanism for controlling the exciting or energizing of the electromagnet, which switch mechanism comprises a longitudinally movable sleeve having a button thereon which is adapted to be moved into the stationary sleeve, to close the circuit through the electro-magnet, and to provide the longitudinally movable sleeve with a recess or cup in its lower end which in connection with a flexible or rubber diaphragm in the stationary sleeve will create an air suction to retard the outward or return movement of the movable sleeve to its normal position under action of an expansion spring to prolong for a desired period, the exciting of the electro-magnet, and will consequently hold the hiding curtain from in front of their respective indicia.

Other objects of the invention will appear in the following detailed description taken in connection with the accompanying drawings, forming a part of this specification, and in which drawings:

Figure 1 is a rear elevation of a motor vehicle showing the improved signal applied thereto.

Figure 2 is an enlarged rear elevation of the signal illustrating one of the indicia hiding curtains raised so as to permit the exhibiting of the indicia carried by the transparent partition in one of the compartments.

Figure 3 is a cross section taken on the line 3—3 of Figure 2.

Figure 4 is a cross section taken on the line 4—4 of Figure 2.

Figure 5 is a plan view of the steering wheel of a motor vehicle showing the location of the switch mechanism for controlling the energizing of the magnet, of the signal mechanism.

Figure 6 is a fragmentary section through the switch mechanism, and

Figure 7 is a diagrammatic view of the circuit employed in the signal mechanism.

Referring more particularly to the drawings wherein like characters indicate like and corresponding parts throughout the several views, the improved signal mechanism comprises a housing 10, which is attached by means of the attaching standard 11 to a vehicle A. preferably at the rear end thereof. This housing 10 comprises a central rectangular portion 12 and laterally extending arms 13 and 14 which are substantially arrow shaped. Each of these arms 13 and 14 are similar in construction, each having a transparent pane 15 formed its rear face and each of which is provided with a transparent partition 16, therein, inwardly of the transparent pane 15. The transparent partition 16 has an arrow or analogous indicia as indicated at 17 painted upon its outer surface preferably in a bright color so as to be readily visible in the day time. The partition 16 is supported by a suitable metal partition structure 18 which in connection with the transparent partition 16 forms a lamp retaining compartment 19 in the arms 13 or 14. An electric lamp bulb 20 is mounted in the compartment 19, and is connected through the medium of the usual type of wires indicated at 21 to any suitable exciting or energizing source to permit the igniting of the bulb 20 when desired. The curtain 22 is hingedly connected as shown at 23 to the metal partition 18 near the upper end of the transparent partition 16 and normally this curtain 22 which is of metal covers the transparent partition 16 hiding the indicia 17 from view. However, when it is the driver's intention to turn in either direction, for example, when it is his intention to turn to the left, as indicated in Figure 2 of the drawings, the switch button 24 of the switch mechanism 25 is operated, which will close an electric circuit through an electro-magnet 26 mounted in the arm 13 and the energizing of this electromagnet 26 will attract the metal curtain 22, moving the curtain upwardly into the position illustrated in Figure 3 of the drawings and permitting the exhibiting of the indicia 17 and also permitting the passage of the light rays from the bulb 20 through the transparent partitions 15 and 16 for clearly rendering the arm visible and attracting attention thereto when the lamp bulb 20 is energized.

The central rectangular compartment 12 of the casing 10 has a transparent outer or rear side 27 inward of which a transparent partition 28 is mounted, the latter being supported by a suitable metal partition 29 forming the lamp retaining compartment 30. A lamp bulb 31 is mounted in the compartment 30 and like the lamp 20 is connected by means of ordinary wire 32 to an energy supplying source. The partition 28 preferably has the word "Stop" as shown at 23 in Figure 1 of the drawings painted thereon or otherwise suitably impressed thereon so that when the curtain 34 which normally hides the word and the transparent partition 28 is moved upwardly under attraction of the electromagnet 35, this word "Stop" will be clearly visible to any one in the rear of the machine or vehicle A and will acquaint him of the fact that the driver of the vehicle A intends to stop permitting him to act accordingly. This electro-magnet 35 is connected by means of electric wires 36 to the switch button 37 of the switch mechanism 25, while the electro-magnet of the arm 14 is connected to the switch button 38. These switch buttons 24, 37 and 38 carry suitable indicia as shown in Figure 5 of the drawings to permit the operator to know which of the electromagnets he is energizing and consequently to determine the operation of the signal mechanism in accordance with his intentions.

The switch structure 25 comprises a housing 39, which may be attached to one of the arms B of the steering wheel C of the motor vehicle if desired, or this switch box 39 may be attached at any desired position on the vehicle A so as to permit it to be conveniently operated from the driver's seat.

The switch button 24 has the stem 40 formed thereon which extends slidably through the top of the housing 39 as clearly shown in Figure 6 of the drawings, and this stem 40 is connected to one of the wires 41 of the circuit which controls the energizing of the magnet 26, while the other of the wires 41 is connected to the stationary sleeve 42, mounted within the housing 39, and adapted to receive therein the lower inner end of the sleeve 40 for completing a circuit through the wires 41, electro-magnet 26 and a suitable energizing source as indicated at 43 in Figure 7 of the drawings. Suitable insulation sleeves 44 and 45 are mounted about the sleeve 42 and 40 respectively. The sleeve 40 is provided with a recess 46 in its lower end which co-acts with the diaphragm 47 mounted across the sleeve 42 for creating a suction to retard the outward movement of the sleeve 40 under action of the spring 48 after the sleeve has been depressed to permit the energizing of the magnet 26, thereby prolonging the contact of the sleeve 40 and 42 and consequently prolonging the energizing of the magnet 26 at the time that the curtain 22 is held in its raised position to permit the exhibiting of the indicia 17. Each of the switch structures which control the energizing of the magnets in the central portion 12, and in the lateral arms 13 and 14 is identical in connstruction with the switch structure including a button 24, as heretofore described and as illustrated in Figure 6 of the drawings.

Changes in details may be made without departing from the spirit of this invention; but,

I claim:

1. A vehicle signal, comprising a casing having a compartment, said compartment having a transparent rear wall, a transparent partition in said compartment, a signal lamp in rear of said transparent partition, a supporting partition for said transparent partition forming in connection with said transparent partition a lamp retaining compartment, signal indicia on said transparent partition, a hingedly mounted shutter of magnetic material disposed in front of the transparent partition and normally hiding the indicia from view and carried by the supporting partition, an electromagnet in the first mentioned compartment, said magnet adapted to attract said shutter to move the same from in front of the indicia upon said transparent partition, the shutter forming the armature for the magnet.

2. In a signal apparatus, a casing having a transparent wall, a signal compartment in the casing, second transparent wall for the signal compartment arranged parallel to said first transparent wall, signal indicia on the second transparent wall, a signal lamp in the signal compartment, a metallic shutter of magnetic material normally concealing said indicia, means hingedly securing the shutter to said signal compartment, an electromagnet disposed at right angles to the signal compartment for acting directly on said shutter to move the same away from the second transparent wall to expose said indicia when the electromagnet is energized.

HORACE F. TAYLOR, JR.